(12) United States Patent
Rahimi (10) Patent No.: US 12,306,870 B2
(45) Date of Patent: May 20, 2025

(54) SET OF RESONATOR NETWORKS FOR FACTORIZING HYPER VECTORS

(71) Applicant: INTERNATIONAL BUSINESS MACHINES CORPORATION, Armonk, NY (US)

(72) Inventor: Abbas Rahimi, Zurich (CH)

(73) Assignee: International Business Machines Corporation, Armonk, NY (US)

(*) Notice: Subject to any disclaimer, the term of this patent is extended or adjusted under 35 U.S.C. 154(b) by 559 days.

(21) Appl. No.: 17/658,536

(22) Filed: Apr. 8, 2022

(65) Prior Publication Data

US 2023/0325435 A1 Oct. 12, 2023

(51) Int. Cl.
| | |
|---|---|
| G06F 16/56 | (2019.01) |
| G06F 16/55 | (2019.01) |
| G06F 17/11 | (2006.01) |
| G06F 17/16 | (2006.01) |
| G06N 3/04 | (2023.01) |
| G06N 3/048 | (2023.01) |
| G06T 7/45 | (2017.01) |

(52) U.S. Cl.
CPC .............. *G06F 16/56* (2019.01); *G06F 16/55* (2019.01); *G06F 17/11* (2013.01); *G06F 17/16* (2013.01); *G06N 3/048* (2023.01); *G06T 7/45* (2017.01); *G06T 2207/20024* (2013.01); *G06T 2207/20084* (2013.01); *G06T 2207/20228* (2013.01)

(58) Field of Classification Search
None
See application file for complete search history.

(56) References Cited

U.S. PATENT DOCUMENTS 10,971,226 B2 * 4/2021 Le Gallo-Bourdeau ..................... G11C 13/004

FOREIGN PATENT DOCUMENTS

CN 110489515 A 11/2019

OTHER PUBLICATIONS

Kent, et al., "Resonator Circuits for Factoring High-Dimensional Vectors," arXiv Vanity, [accessed Oct. 14, 2021], 31 pgs., <https://www.arxiv-vanity.com/papers/1906.11684/>. (Year: 2021).*

(Continued)

*Primary Examiner* — Andrew H Lam
(74) *Attorney, Agent, or Firm* — Andre L. Adkins (57) ABSTRACT

The present disclosure relates to a resonator network system comprising a set of resonator networks, each resonator network being configured to execute a resonator network, the resonator network being configured to receive an input hypervector representing a data structure and to perform an iterative process in order to factorize the input hypervector into individual hypervectors representing a set of concepts respectively, the set of N resonator networks being associated with N permutations respectively. The resonator network system being configured for applying the N permutations to N first hypervectors respectively, the N first hypervectors representing a set of N data structures respectively; and combining the N permuted hypervectors into a bundled hypervector. The resonator networks being configured for processing the bundled hypervector respectively, thereby factorizing the first hypervectors.

16 Claims, 9 Drawing Sheets

(56) References Cited

OTHER PUBLICATIONS

Kent, et al., "Resonator Circuits for Factoring High-Dimensional Vectors," arXiv Vanity, [accessed Oct. 14, 2021], 31 pgs. <https://www.arxiv-vanity.com/papers/1906.11684/>.(Year:2021) (Year: 2021).*
Hersche, et al., "Near-channel Classifier: Symbiotic Communication and Classification in High-dimensional Space," Brain Inf. (2021) 8:16, 15 pgs., <https://braininformatics.springeropen.com/track/pdf/10.1186/s40708-021-00138-0.pdf>.
Kent, "Multiplicative Coding and Factorization in Vector Symbolic Models of Cognition," Dissertation, University of California, Berkeley, Fall, 2020, 114 pgs., <https://digitalassets.lib.berkeley.edu/etd/ucb/text/Kent_berkeley_0028E_20225.pdf>.
Kent, et al., "Resonator Circuits for Factoring High-Dimensional Vectors," arXiv Vanity, [accessed Oct. 14, 2021], 31 pgs., <https://www.arxiv-vanity.com/papers/1906.11684/>.
Kent, et al., "Resonator Networks Outperform Optimization Methods at Solving High-Dimensional Vector Factorization," arXiv:1906.11684v4 [cs.NE], Jul. 14, 2020, 61 pgs.
Kent, et al., "Resonator Networks, 2: Factorization Performance and Capacity Compared to Optimization-Based Methods," Neural Computation 32, MIT, 2020, pp. 2332-2388.

\* cited by examiner

SET OF RESONATOR NETWORKS FOR FACTORIZING HYPER VECTORS

BACKGROUND

The present invention relates to the field of digital computer systems, and more specifically, a set of resonator networks for factorizing hypervectors.

Resonator networks are defined in the following references: E. Paxon Frady et al. "Resonator networks for factoring distributed representations of data structures", Neural Computation 2020 and Spencer J. Kent et al. "Resonator Networks outperform optimization methods at solving high-dimensional vector factorization," Neural Computation 2020. Given a hypervector formed from an element-wise product of two or more atomic hypervectors (each from a fixed codebook), the resonator network may find its factors. The resonator network may iteratively search over the alternatives for each factor individually rather than all possible combinations until a set of factors is found that agrees with the input hypervector.

SUMMARY

Various embodiments provide a method and resonator network system as described by the subject matter of the independent claims. Advantageous embodiments are described in the dependent claims. Embodiments of the present invention can be freely combined with each other if they are not mutually exclusive.

In one aspect, the invention relates to a method providing an encoder for representing data structures in a vector space, the vector space being defined by a set of matrices, referred to herein as codebooks, which encode a set of cognitive concepts respectively, the codebooks comprising candidate code hypervectors representing items of the respective concept; providing a set of N resonator networks, where N>1, each resonator network being configured to receive an input hypervector representing a data structure and to perform an iterative process in order to factorize the input hypervector into individual hypervectors representing the set of concepts respectively, the set of N resonator networks being associated with N permutations respectively; representing using the encoder a set of N data structures by N hypervectors (herein referred to as N first hypervectors) respectively; applying the N permutations to the N first hypervectors respectively; combining the N permuted hypervectors into a bundled hypervector; processing the bundled hypervector by the resonator networks, thereby factorizing the N first hypervectors.

With this embodiment, the processing of the bundled hypervector at the respective resonator network includes applying to the bundled hypervector an inverse permutation of the permutation associated with the resonator network resulting in a second hypervector; and processing the second hypervector.

With this embodiment, the processing of the bundled hypervector being performed in parallel by the set of resonator networks.

With this embodiment, the processing includes ranking the N resonator networks; scaling the bundled hypervector by the number N of resonator networks; sequentially processing the scaled bundled hypervector in accordance with the ranking; wherein the processing by a current resonator network includes producing a second hypervector by subtracting from the scaled bundled hypervector zero or more outputs of the zero or more preceding resonator networks; processing by the resonator network the second hypervector.

With this embodiment, the ranking of the resonator network being performed such that an ordering of subtractions is applied to prevent noise amplification in the second hypervector.

With this embodiment, a search space is defined by the number of candidate code hypervectors each having a size D, the method further including increasing the size D of the candidate hypervectors while maintaining the same search space.

With this embodiment, the method further includes preventing access to a permutation of a given resonator network by the other resonator networks.

With this embodiment, the iterative process including for each concept of the set of concepts: computing an unbound version of a hypervector representing the concept, computing a similarity vector indicating a similarity of the unbound version with each candidate code hypervector of the concept, and generating an estimate of a hypervector representing the concept by a linear combination of the candidate code hypervectors, with weights given by the similarity vector, followed by an application of a non-linear function.

With this embodiment, the non-linear function is a sign function.

With this embodiment, the encoder being a feed forward neural network.

With this embodiment, the data structure being an image, the codebooks representing the concept of colours, the concept of shapes, the concept vertical positioning and the concept of horizontal positioning.

In one aspect, the invention relates to a resonator network system comprising a set of resonator networks, each resonator network being configured to receive an input hypervector representing a data structure and to perform an iterative process in order to factorize the input hypervector into individual hypervectors representing a set of concepts respectively, the set of N resonator networks being associated with N permutations respectively; the resonator network system being configured for applying the N permutations to N first hypervectors respectively, the N first hypervectors representing a set of N data structures respectively; and combining the N permuted hypervectors into a bundled hypervector; the resonator networks being configured for processing the bundled hypervector, thereby factorizing the N first hypervectors.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

In the following embodiments of the invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Data structures may enable to represent cognitive concepts, such as colours, shapes, positions, etc. Each cognitive concept may comprise items e.g., items of the colour concept may comprise red, green, blue etc. The data structure may contain a combination (e.g., product) of multiple components each representing a cognitive concept. For example, the data structure may be an image of a red disk in the bottom right and a green rectangle in the top left, wherein the cognitive concepts may be the colour, shape, and position. In another example, a data structure may form a distributed representation of a tree, wherein each leaf in the tree may represent a concept, and each type of traversal operations in the tree may represent concepts.

The data structure may be encoded by an encoder into a hypervector that uniquely represents the data structure. A hypervector may be a vector of bits, integers, real or complex numbers. The hypervector is a vector having a dimension higher than a minimum dimension, e.g., 100. The hypervector may be holographic with independent and identically distributed (i.i.d) components. The hypervector being holographic means that each bit position in the hypervector may have an equal weight, in contrast to a conventional model with most significant bits and least significant bits. The encoder may combine hypervectors that represent individual concepts with operations in order to represent a data structure. For example, the above mentioned image may be described as a combination of multiplication (or binding) and addition (or superposition) operations as follows: (bottom right*red*disk)+(top left*green*rectangle). The encoder may represent the image using hypervectors that represent the individual concepts and said operations to obtain the representation of the image as a single hypervector that distinctively represents the knowledge that the disk is red and placed at the bottom right and the rectangle is green and placed at the top left. The encoder may be defined by a vector space of a set of hypervectors which encode a set of cognitive concepts and algebraic operations on this set. The algebraic operations may, for example, comprise a superposition operation and a binding operation. In addition, the algebraic operations may comprise a permutation operation. The vector space may, for example, be a D-dimensional space, where D>100. The hypervector may be a D-dimensional vector comprising D numbers that define the coordinates of a point in the vector space. The D-dimensional hypervectors may be in $\{\pm 1\}^D$ and thus may be referred to as "bipolar." For example, a hypervector may be understood as a line drawn from the origin to the coordinates specified by the hypervector. The length of the line may be the hypervector's magnitude. The direction of the hypervector may encode the meaning of the representation. The similarity in meaning may be measured by the size of the angles between hypervectors. This may typically be quantified as a dot product between hypervectors. The encoder may be a decomposable (i.e., factored) model to represent the data structures. This may be advantageous as the access to the hypervectors may be decomposed into the primitive or atomic hypervectors that represent the individual items of the concepts in the data structure. For example, the encoder may use a Vector Symbolic Architecture (VSA) technique in order to represent the data structure by a hypervector. The encoder may enable to perform an elementwise multiply operation. The encoder may, for example, comprise a trained feed-forward neural network.

Hence, the encoding of data structures may be based on a predefined set of F concepts, where F>1 and candidate items that belong to each of the F concepts. Each candidate item may be represented by a respective hypervector. Each concept may be represented by a matrix of the hypervectors representing candidate items of the concept, e.g., each column of the matrix may be a distinct hypervector. The matrix may be referred to as codebook and the hypervector representing one item of the concept may be referred to as code hypervector. The components of the code hypervector may, for example, be randomly chosen. For example, a codebook representing the concept of colours may comprise seven possible colours as candidate items, a codebook representing the concept of shapes may comprise 26 possible shapes as candidate items etc. The codebooks representing the set of concepts may be referred to as $X_1, X_2 \ldots X_F$ respectively. Each codebook $X_1$ may comprise $M_{x_i}$ code hypervectors $$x^1 \ldots x^{M_{x_i}}.$$

Querying such data structures through their hypervector representations may require decoding the hypervectors. For example, to read the components of an encoded data structure, the hypervector representing it may be decomposed into the primitives or atomic vectors from which it is built. This procedure is called decoding. Decoding such hypervectors may be performed by testing every combination of code hypervectors. However, this may be very resource consuming. The present subject matter may solve this issue by using the resonator network. The resonator network may be an iterative approach. In particular, the resonator network can efficiently decode a given hypervector without needing to directly test every combination of factors making use of the fact that the superposition operation is used for the encoding of multiple concept items in the given hypervector and the fact that randomized code hypervectors may be highly likely to be close to orthogonal in the vector space, meaning that they can be superposed without much interference. For that, the resonator network may search for possible factorizations of the given hypervector by combining a strategy of superposition and clean-up memory. The clean-up memory may reduce some crosstalk noise between the superposed concept items. The resonator network combines the strategy of superposition and clean-up memory to efficiently search over the combinatorially large space of possible factorizations.

Assuming for a simplified description of the iterative process of the resonator network that the set of concepts comprises three concepts i.e., F=3, but it is not limited to. The codebooks/matrices representing the set of concepts may be referred to as X, Y and Z respectively (i.e., $X=X_1$, $Y=X_2$ and $Z=X_3$.). The codebook X may comprise $M_x$ code hypervectors $x^1 \ldots x^{M_x}$. The codebook Y may comprise $M_y$ code hypervectors $y^1 \ldots y^{M_Y}$. The codebook Z may comprise $M_z$ code hypervectors $z^1 \ldots z^{M_z}$. This may define a search space of size $M=M_x \cdot M_y \cdot M_z$. Since the resonator network is used, a data structure may be represented by a hypervector s which may be factorized into individual hypervectors representing the set of concepts respectively i.e., that is, the hypervector s may be defined as follows $s = x^\alpha \odot y^\beta \odot z^\gamma$. The iterative process may find $x^\alpha$, $y^\beta$, $z^\gamma$ where $\alpha \in \{1, 2, \ldots, M_x\}$, $\beta \in \{1, 2, \ldots, M_y\}$ and $\gamma \in \{1, 2, \ldots, M_z\}$.

The present subject matter may provide a set of N resonator networks, each resonator network r (r=1, ... N) being configured to perform the iterative process in order to factorize a respective input hypervector $s_r$ (which is assumed to be defined as $s = x^{\alpha_r} \odot y^{\beta_r} \odot z^{\gamma_r}$) in order to find $x^{\alpha_r}$, $y^{\beta_r}$ and $z^{\gamma_r}$ that may define an output, named factorized hypervector, $f_r = x^{\alpha_r} \odot y^{\beta_r} \odot z^{\gamma_r}$.

The iterative process may be implemented according to the present subject matter by each resonator network as follows. Given the hypervector $s_r$ that represents the data structure and given the set of predefined concepts, an initialization step may be performed by initializing an estimate of the hypervector that represents each concept of the set of concepts. The initial estimates $\hat{x}(0)$, $\hat{y}(0)$ and $\hat{z}(0)$ may, for example, be defined as a superposition of all candidate code hypervectors of the respective concept e.g., $\hat{x}(0) = \text{sign}(\Sigma_{i=1, \ldots, M_x} x^i)$, $\hat{y}(0) = \text{sign}(\Sigma_{j=1, \ldots, M_y} y^j)$ and $\hat{z}(0) = (\Sigma_{k=1, \ldots, M_z} z^k)$. The term "estimate of a hypervector u" refers to a hypervector of the same size as hypervector u. The resonator network may comprise a first buffer for storing the hypervector $s_r$ and a second set of buffers for (initially) storing the estimates $\hat{x}(0)$, $\hat{y}(0)$ and $\hat{z}(0)$.

And, for each current iteration t of the iterative process, the following may be performed. Unbound hypervectors $\tilde{x}(t)$, $\tilde{y}(t)$ and $\tilde{z}(t)$ may be computed. Each of the unbound hypervectors may be an estimate of the hypervector that represents the respective concept of the set of concepts. Each of the unbound hypervectors may be inferred from the hypervector $s_r$ based on the estimates of hypervectors for the other remaining F−1 concepts of the set of concepts which are currently stored in the second set of buffers. The unbound hypervectors may be computed as follows: $\tilde{x}(t) = s_r \odot \hat{y}(t) \odot \hat{z}(t)$, $\tilde{y}(t) = s_r \odot \hat{x}(t) \odot \hat{z}(t)$ and $\tilde{z}(t) = s_r \odot \hat{x}(t) \odot \hat{y}(t)$, where $\odot$ refers to elementwise multiplication. This first definition of the unbound hypervectors may particularly be advantageous if the estimate hypervectors $\hat{x}(t)$, $\hat{y}(t)$ and $\hat{z}(t)$ may be computed in parallel and the unbound hypervectors may be computed in parallel. For that, the resonator network may comprise a circuit that is configured to read the first buffer and the second set of buffers and to apply the elementwise multiplications. This may be referred to as an inference step. The inference step may, however, be noisy if many estimates (e.g., F−1 is high) are tested simultaneously. The unbound hypervectors $\tilde{x}(t)$, $\tilde{y}(t)$ and $\tilde{z}(t)$ may be noisy. This noise may result from crosstalk of many quasi-orthogonal code hypervectors, and may be reduced through a clean-up memory. After providing the unbound version of a hypervector of a given concept, the clean-up memory may be used to find the similarity of each code hypervector of said concept to the unbound version of the hypervector. This may be referred to as a similarity step. The similarity may be computed as a dot product of the codebook that represents said concept by the unbound version of the hypervector, resulting in an attention vector $\alpha_x(t)$, $\alpha_y(t)$ and $\alpha_z(t)$ respectively. The attention vector may be referred to herein as similarity vector. The similarity vectors $\alpha_x(t)$, $\alpha_y(t)$ and $\alpha_z(t)$ have sizes $M_x$, $M_y$ and $M_z$ respectively and may be obtained as follows: $\alpha_x(t) = X^T \tilde{x}(t) \in \mathbb{R}^{M_x}$, $\alpha_y(t) = Y^T \tilde{y}(t) \in \mathbb{R}^{M_y}$ and $\alpha_z(t) = Z^T \tilde{z}(t) \in \mathbb{R}^{M_z}$. For example, for computing the similarity vector $\alpha_x(t)$, the unbound hypervector $\tilde{x}(t)$ may be input to the column lines of a crossbar array of memresistive devices for receiving through row lines of the crossbar the computed similarity vector $\alpha_x(t)$ indicating a similarity of the unbound hypervector $\tilde{x}(t)$ with each candidate code hypervector of the concept (X) e.g., the largest element of $\alpha_x(t)$ may indicate the code hypervector which matches best the unbound hypervector $\tilde{x}(t)$. For computing the similarity vector $\alpha_y(t)$, the unbound hypervector $\tilde{y}(t)$ may be input to the column lines of the crossbar array of memresistive devices for receiving through row lines the computed similarity vector $\alpha_y(t)$ indicating a similarity of the unbound hypervector $\tilde{y}(t)$ with each candidate code hypervector of the concept (Y) e.g., the largest element of $\alpha_y(t)$ may indicate the code hypervector which matches best the unbound hypervector $\tilde{y}(t)$. For computing the similarity vector $\alpha_z(t)$, the unbound hypervector $\tilde{z}(t)$ may be input to the column lines of the crossbar array of memresistive devices for receiving through row lines the computed similarity vector $\alpha_z(t)$ indicating a similarity of the unbound hypervector $\tilde{z}(t)$ with each candidate code hypervector of the concept (Z) e.g., the largest element of $\alpha_z(t)$ indicates the code hypervector which matches best the unbound hypervector $\tilde{z}(t)$. A weighted superposition of the similarity vectors $\alpha_x(t)$, $\alpha_y(t)$ and $\alpha_z(t)$ may be performed. This may be referred to as the superposition step. The superposition step may be performed on the similarity vectors $\alpha_x(t)$, $\alpha_y(t)$ and $\alpha_z(t)$ as follows: $\hat{x}(t+1) = \alpha_x(t) X$, $\hat{y}(t+1) = \alpha_y(t) Y$ and $\hat{z}(t+1) = \alpha_z(t) Z$ respectively, in order to obtain the current estimates $\hat{x}(t+1)$, $\hat{y}(t+1)$ and $\hat{z}(t+1)$ respectively of the hypervectors that represent the set of concepts. In other words, the superposition step generates each of the estimates $\hat{x}(t+1)$, $\hat{y}(t+1)$ and $\hat{z}(t+1)$ representing the respective concept by a linear combination of the candidate code hypervectors (provided in respective matrices X, Y and Z), with weights given by the respective similarity vectors $\alpha_x(t)$, $\alpha_y(t)$ and $\alpha_z(t)$. $\hat{x}(t+1)$, $\hat{y}(t+1)$ and $\hat{z}(t+1)$ may, for example, be computed using a crossbar array of memresisitive devices. The iterative process may stop if a convergence criterion is fulfilled. The convergence criterion may, for example, require that the value of at least one element of each similarity vector $\alpha_x(t)$, $\alpha_y(t)$ and $\alpha_z(t)$ exceeds a threshold. In another example, the convergence criterion may require a predefined number of iterations to be reached.

The present subject matter may make use of the set of resonator networks to efficiently process multiple data structures. For that, a set of N data structures may be provided, wherein the number of data structures is equal to the number of resonator networks in the set of resonator networks. Each data structure may be encoded by the encoder in order to obtain a hypervector $b_r$ that represents the data structure. A set of N permutations $\rho_1, \rho_2 \ldots \rho_N$ may be applied on the N hypervectors $b_1, b_2 \ldots b_N$ respectively as follows: $\rho_1 b_1$, $\rho_2 b_2 \ldots \rho_N b_N$. The set of N permutations $\rho_1, \rho_2 \ldots \rho_N$ may be assigned to the set of set of N resonator networks respectively. Assigning separate permutations to the resonator networks may enable to protect individual resonator networks from each other, and may thus be referred to as resonator islands. These permutations may be advantageous as they may create quasi-orthogonal subspaces (e.g., the set of resonator networks may be considered as different protected resonator islands), that is, the resulting hypervectors $\rho_1 b_1, \rho_2 b_2 \ldots \rho_N b_N$ may not be interfering with each other. The resulting hypervectors $\rho_1 b_1, \rho_2 b_2 \ldots \rho_N b_N$ may be combined (summed) into one hypervector $S \in \{\pm 1\}^D$ as follows: $S=[\rho_1 b_1+\rho_2 b_2 \ldots +\rho_N b_N]$, where hypervector S may be referred to as bundled hypervector. The brackets refer to a sign clipping that normalizes the values of the bundled hypervector to +1. All product vectors $b_1, b_2 \ldots b_N$ may have the same power in the bundled hypervector by construction. A generation method may be performed for generating for each resonator network of the set of resonator networks an input hypervector $s_r$ from the bundled hypervector S. Using the input hypervectors $s_1, s_2 \ldots s_N$ the set of resonator networks may provide N factorized hypervectors $f_1, f_2 \ldots f_N$ ($f_r = x^{\alpha_r} \odot y^{\beta_r} \odot z^{\gamma_r}$) which factorize the N hypervectors $b_1, b_2 \ldots b_N$ respectively.

The computational complexity of the factorization of a resonator network may be mainly determined by $O(D \times I)$ where D is the hypervector dimension, and I the number of iterations to converge. The present subject matter may provide an architecture that may significantly reduce this complexity by jointly exploiting the additive and multiplicative superpositions of multiple resonator networks. The present subject matter may efficiently factorize the hypervector representing a data structure into the primitives from which it is composed. For example, given a hypervector formed from an element-wise product of two or more hypervectors, its factors (i.e., the two or more hypervectors) may be efficiently found. According to the present subject matter, initial hypervectors may first be bound together (creating product vectors), and bundled (i.e., added) together after permutations. Therefore, the present subject matter may jointly exploit the additive and multiplicative aspects of hypervectors. This is by contrast to a single resonator which is only exploiting multiplicative superposition (without additive superposition).

In one example implementation, the generation method comprises generating for each resonator network r of the set of resonator networks the respective input hypervector $s_r$ by applying the inverse of the permutation $\rho_r^{-1}$ associated with the resonator network r to the bundled hypervector S as follows: $\rho_r^{-1} S = s_r$, i.e., $\rho_1^{-1} S = s_1, \rho_2^{-1} S = s_2 \ldots \rho_N^{-1} S = s_N$. Each resonator network may apply its own inverse permutation, and iterate independently to disentangle the bundled hypervector. The set of resonator networks may process the respective inputs $s_1, s_2 \ldots s_N$ to provide N factorized hypervectors $f_1, f_2 \ldots f_N$ ($f_r = x^{\alpha_r} \odot y^{\beta_r} \odot z^{\gamma_r}$) which factorize the N hypervectors $b_1, b_2 \ldots b_N$ respectively. This may enable to exploit the additive and multiplicative superpositions that may allow to iteratively search over the alternatives for each resonator network individually rather than all possible combinations until all the sets of factors are found that agree with the corresponding product vectors. This may significantly reduce dimensionality of the encoded vectors. In one example, the processing of the respective inputs $s_1, s_2 \ldots s_N$ may be performed in parallel. This may be advantageous as it may speed up the factorization of multiple input hypervectors.

In one example implementation, the generation method comprises: ranking the set of N resonator networks and scaling the bundled hypervector S by the number N ($\times$N) of resonator networks. The scaled bundled hypervector may still be bipolar as bundled hypervector S to enable successive interference cancellation. The scaled bundled hypervector S×N may be processed sequentially in accordance with the ranking. For example, the first ranked resonator network may be indexed by 1, the second resonator network by 2 and so on. The processing may first be performed by the resonator network 1, followed by the resonator network 2 and so on. The processing by a current resonator network r comprises: producing an input hypervector $s_r$ by subtracting from the scaled bundled hypervector S×N the r−1 factorized hypervectors $f_1 \ldots f_{r-1}$ that resulted from the preceding resonator networks 1, ..., r−1 respectively. That is, $s_r = S \times N - \sum_{j=1}^{r-1} f_j$ if r>1, otherwise $s_r = S \times N$. This sequential processing may further improve the convergence speed.

All product vectors $b_1, b_2 \ldots b_N$ may have the same power in the bundled hypervector by construction. However, when noise is added to bundled hypervector S, the ranking may be advantageous as it may determine an optimal ordering of subtractions to be applied. For example, the sequence of subtractions may be guided to avoid noise amplification. Hence, in one example, the ranking may be performed based on the similarly scores between the bundled hypervector and estimated product vectors from the resonator islands. These ranked similarity scores can guide the subtractions to avoid noise amplification.

As described herein, the search space may be defined by the number of code hypervectors, per concept, each having a size D as follows: $M = M_x \cdot M_y \cdot M_z$, in case F=3. The possible combinations C that can be covered by the search space M may depend on the size D of the hypervectors by the following operational capacity equation $C = \sigma_0 + \sigma_1 D + \sigma_2 D^2$. In one example, the method further comprises: increasing the size D of the candidate hypervectors to a new size $D_{over}$ while maintaining the same search space $M = M_x \cdot M_y \cdot M_z$ e.g., so that $C \ll \sigma_0 + \sigma_1 D_{over} + \sigma_2 D_{over}^2$. This may enable to overspecify a resonator network. The vector dimensionality may be intentionally set to a larger value than what it is defined by the operational capacity equation. It may lead to faster convergence and hence lower the effective number of operations in the decoding stage. In one example, the value of new size $D_{over}$ may be obtained using an optimization method. The optimization method may search the optimal value of the new size $D_{over}$ that is higher than the initial size D but still providing better performance. An example optimization method is shown with reference to FIG. 6.

Figure 1:
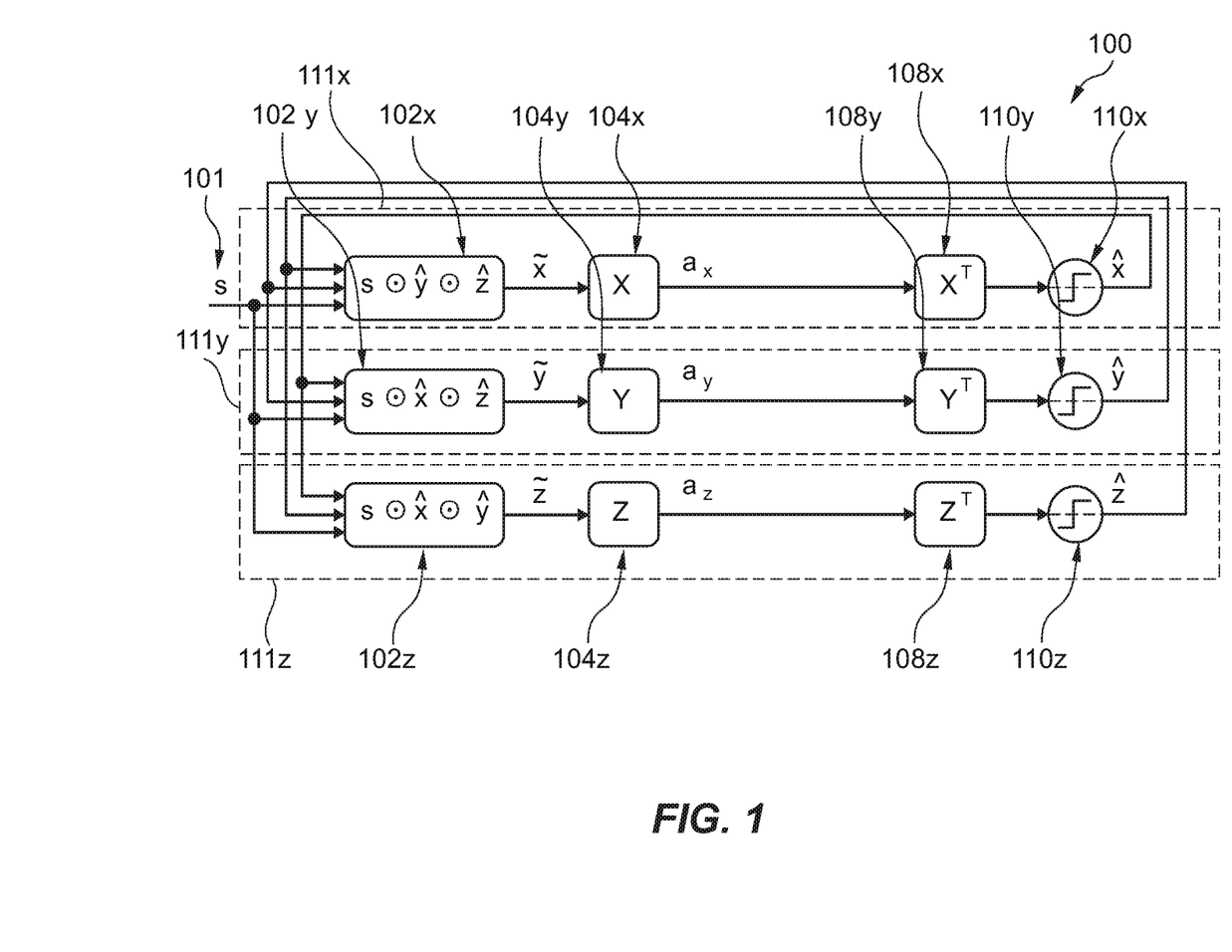
FIG. 1 is a diagram illustrating a resonator network in accordance with an example of the present subject matter.

Referring now to FIG. 1, a diagram illustrating a resonator network 100 is depicted in accordance with an example of the present subject matter.

The resonator network 100 may be configured to execute a resonator network to decode hypervectors that are encoded in a vector space defined by three concepts. The codebooks representing the set of concepts may be referred to as X, Y and Z respectively. The codebook X may comprise $M_x$ code hypervectors $x^1 \ldots x^{M_x}$. The codebook Y may comprise $M_y$ code hypervectors $y^1 \ldots y^{M_y}$. The codebook Z may comprise $M_z$ code hypervectors $z^1 \ldots z^{M_z}$. This may define a search space of size $M=M_x \cdot M_y \cdot M_z$. The resonator network may, for example, be a recurrent neural network. The resonator network 100 may comprise network nodes 102x, 102y and 102z that represent respectively the three concepts. The resonator network 100 may further comprise memories 108x, 108y and 108z for storing the codebooks $X^T$, $Y^T$ and $Z^T$ respectively. The resonator network 100 may further comprise memories 104x, 104y and 104z for storing the transposes X, Y and Z of the codebooks respectively. The resonator network 100 may further comprise non-linear units 110x, 110y and 110z for each of the three concepts that implement the sign function. As indicated in FIG. 1, the concepts of the vector space may be associated with processing lines 111x, 111y and 111z respectively, wherein each processing line that may provide an estimate of a hypervector representing the respective concept, e.g., the processing line 111x provides estimates $\hat{x}$, the processing line 111y provides estimates $\hat{y}$ and the processing line 111z provides estimates $\hat{z}$.

An input hypervector 101 named s may be received by the resonator network 100. The input hypervector s may be the result of encoding a data structure such as a coloured image comprising MNIST digits. The encoding may be performed by a VSA technique. At t=0 the resonator network 100 may initialize an estimate of the hypervector that represents each concept of the set of concepts as a superposition of all candidate code hypervectors of said concept as follows: $\hat{x}(0)=\text{sign}(\Sigma_{i=1,\ldots,M_x} x^i)$, $\hat{y}(0)=\text{sign}(\Sigma_{j=1,\ldots,M_y} y^j)$ and $\hat{z}(0)=\text{sign}(\Sigma_{k=1,\ldots,M_z} z^k)$.

The operation of the resonator network 100 may be described for a current iteration t. The network nodes 102x, 102y and 102z may receive simultaneously or substantially simultaneously the respective triplet (s, $\hat{y}(t)$, $\tilde{z}(t)$), (s, $\tilde{x}(t)$, $\tilde{z}(t)$) and (s, $\tilde{x}(t)$, $\hat{y}(t)$). The three network nodes may compute the first estimates $\tilde{x}(t)$, $\tilde{y}(t)$ and $\tilde{z}(t)$ of the hypervectors that represent the set of concepts respectively as follows: $\tilde{x}(t)=s\odot\hat{y}(t)\odot\tilde{z}(t)$, $\tilde{y}(t)=s\odot\tilde{x}(t)\odot\tilde{z}(t)$ and $\tilde{z}(t)=s\odot\tilde{x}(t)\odot\hat{y}(t)$, where $\odot$ refers to elementwise multiplication. This may be referred to as an inference step. That is, the nodes may be perform the inference step on respective input triplets.

The similarity of the first estimate $\tilde{x}(t)$ with each of the $M_x$ code hypervectors $x_i \ldots x_{M_x}$ may be computed using the codebook X stored in memory 104x as follows: $\alpha_x(t)=X^T\tilde{x}(t)\in\mathbb{R}^{M_x}$ for multiplying the hypervector $\tilde{x}(t)$ by the matrix $X^T$. The similarity of the first estimate $\tilde{y}(t)$ with each of the $M_y$ code hypervectors $y_j \ldots y_{M_y}$ may be computed using the codebook Y stored in memory 104y as follows: $\alpha_y(t)=Y^T\tilde{y}(t)\in\mathbb{R}^{M_y}$ for multiplying the hypervector $\tilde{y}(t)$ by the matrix $Y^T$. The similarity of the first estimate $\tilde{z}(t)$ with each of the $M_z$ code hypervectors $z_k \ldots z_{M_z}$ may be computed using the codebook Z stored in memory 104z as follows: $\alpha_z(t)=Z^T\tilde{z}(t)\in\mathbb{R}^{M_z}$ for multiplying the hypervector $\tilde{z}(t)$ by the matrix $Z^T$. The resulting vectors $\alpha_x(t)$, $\alpha_y(t)$ and $\alpha_z(t)$ may be named similarity vectors or attention vectors. The largest element of each of the similarity vectors $\alpha_x(t)$, $\alpha_y(t)$ and $\alpha_z(t)$ indicates the code hypervector which matches best the first estimate $\tilde{x}(t)$, $\tilde{y}(t)$ and $\tilde{z}(t)$ respectively.

After obtaining the similarity vectors $\alpha_x(t)$, $\alpha_y(t)$ and $\alpha_z(t)$, a weighted superposition of the similarity vectors $\alpha_x(t)$, $\alpha_y(t)$ and $\alpha_z(t)$ may be performed using the codebooks $X^T$, $Y^T$ and $Z^T$ stored in memories 108x, 108y, and 108z respectively. This may be performed by the following matrix vector multiplications: $X\alpha_x(t)$, $Y\alpha_y(t)$ and $Z\alpha_z(t)$. The resulting hypervectors $X\alpha_x(t)$, $Y\alpha_y(t)$ and $Z\alpha_z(t)$ may be fed to the sign units 110x, 110y and 110z respectively. This may enable to obtain: $\hat{x}(t+1)=\text{sign}(X\alpha_x(t))$, $\hat{y}(t+1)=\text{sign}(Y\alpha_y(t))$ and $\hat{z}(t+1)=\text{sign}(Z\alpha_z(t))$ respectively, in order to obtain the estimate of the hypervectors $\hat{x}(t+1)$, $\hat{y}(t+1)$ and $\hat{z}(t+1)$ respectively for the next iteration t+1. This may enable the superposition step of the iterative process. For each concept of the concepts the superposition step may receive as input the respective one of the similarity vectors $\alpha_x(t)$, $\alpha_y(t)$ and $\alpha_z(t)$ and provides as an output the respective one of the hypervectors $\hat{x}(t+1)$, $\hat{y}(t+1)$ and $\hat{z}(t+1)$. Hence, the estimate of the hypervectors representing the set of concepts respectively may be defined according to the present system as follows $\hat{x}(t+1)=g(XX^T(s\odot\hat{y}(t)\odot\hat{z}(t)))$, $\hat{y}(t+1)=g(YY^T(s\odot\hat{z}(t)\odot\hat{z}(t)))$ and $\hat{z}(t+1)=g(ZZ^T(s\odot\hat{z}(t)\odot\hat{y}(t)))$ where g is the activation function such as a sign function.

The iterative process may stop if a stopping criterion is fulfilled. The stopping criterion may, for example, require that $\hat{x}(t+1)=\hat{x}(t)$, $\hat{y}(t+1)=\hat{y}(t)$ and $\hat{z}(t+1)=\hat{z}(t)$ or that a maximum number of iterations is reached.

Figure 2:
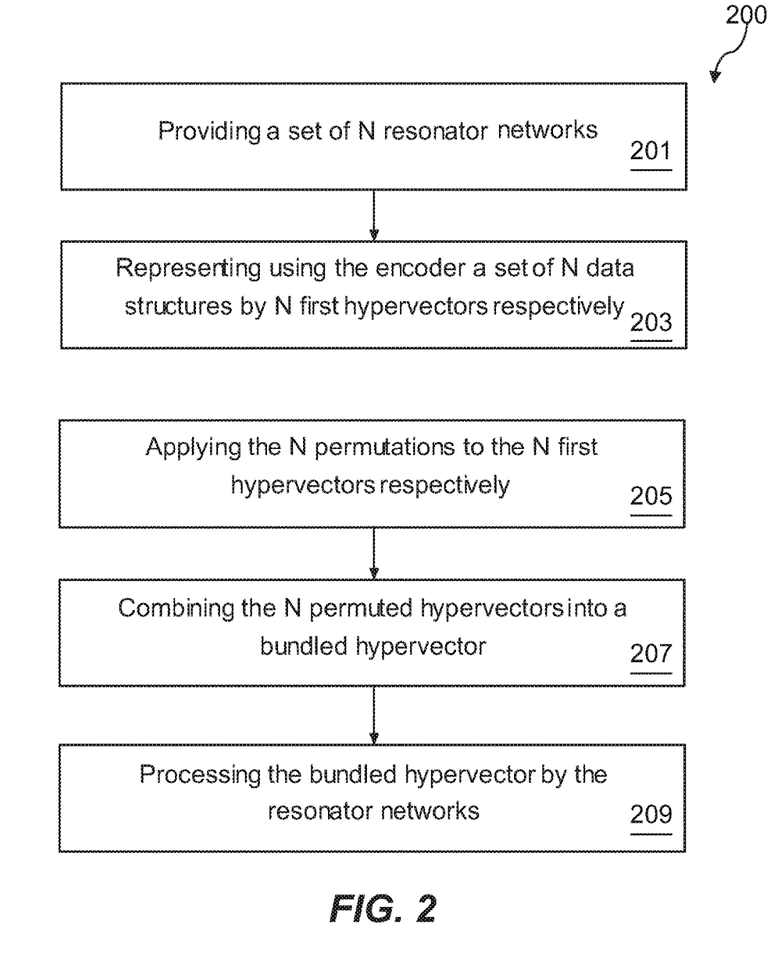
FIG. 2 is a flowchart of a method for factorizing a plurality of hypervectors in accordance with an example of the present subject matter.

Referring now to FIG. 2, a flowchart of a method for factorizing hypervectors 200 is depicted in accordance with an example of the present subject matter. For the purpose of explanation, the method described in FIG. 2 may be implemented in a system comprising multiple resonator networks such as the resonator network of FIG. 1, but is not limited to this implementation.

A set of N resonator networks such as the resonator network of FIG. 1, where N>1 may be provided in step 201. The encoder may represent in step 203 a set of N data structures by N hypervectors $b_1, b_2 \ldots b_N$ respectively. N permutations $\rho_1, \rho_2 \ldots \rho_N$ may be applied in step 205 to the N hypervectors $b_1, b_2 \ldots b_N$ respectively as follows $\rho_1 b_1, \rho_2 b_2 \ldots \rho_N b_N$. The N permuted hypervectors $\rho_1 b_1, \rho_2 b_2 \ldots \rho_N b_N$ may be combined in step 207 into a bundled hypervector S such that $S\in\{\pm 1\}^D$ as follows: $S=[\rho_1 b_1+\rho_2 b_2 \ldots +\rho_N b_N]$, where hypervector S may be referred to as bundled hypervector. The brackets refer to a sign clipping that normalizes the values of the bundled hypervector to ±1. The bundled S hypervector may be processed in step 209 by the set of resonator networks respectively in order to factorize the hypervectors $b_1, b_2 \ldots b_N$ respectively.

Figure 3A:
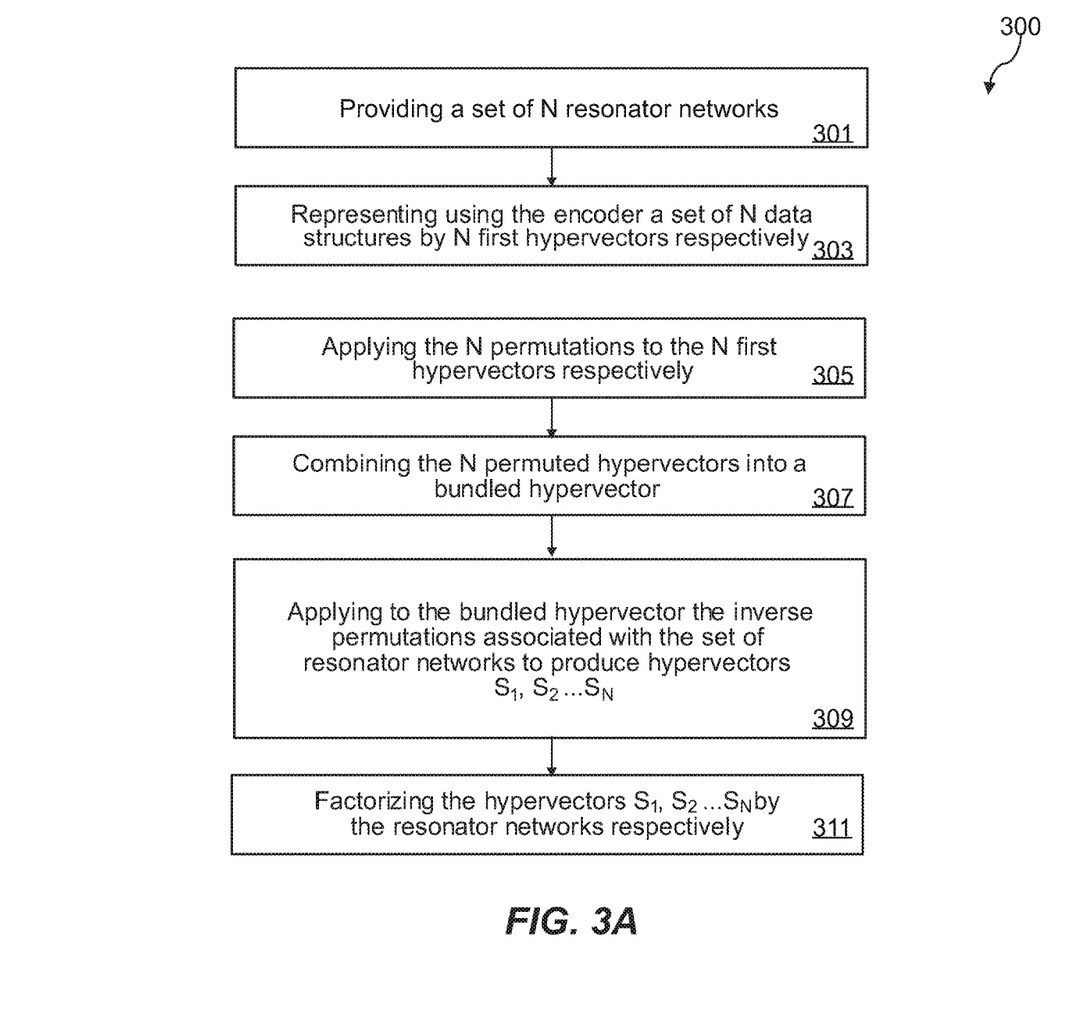
FIG. 3A is a flowchart of a method for factorizing a plurality of hypervectors in accordance with an example of the present subject matter.
Figure 3B:
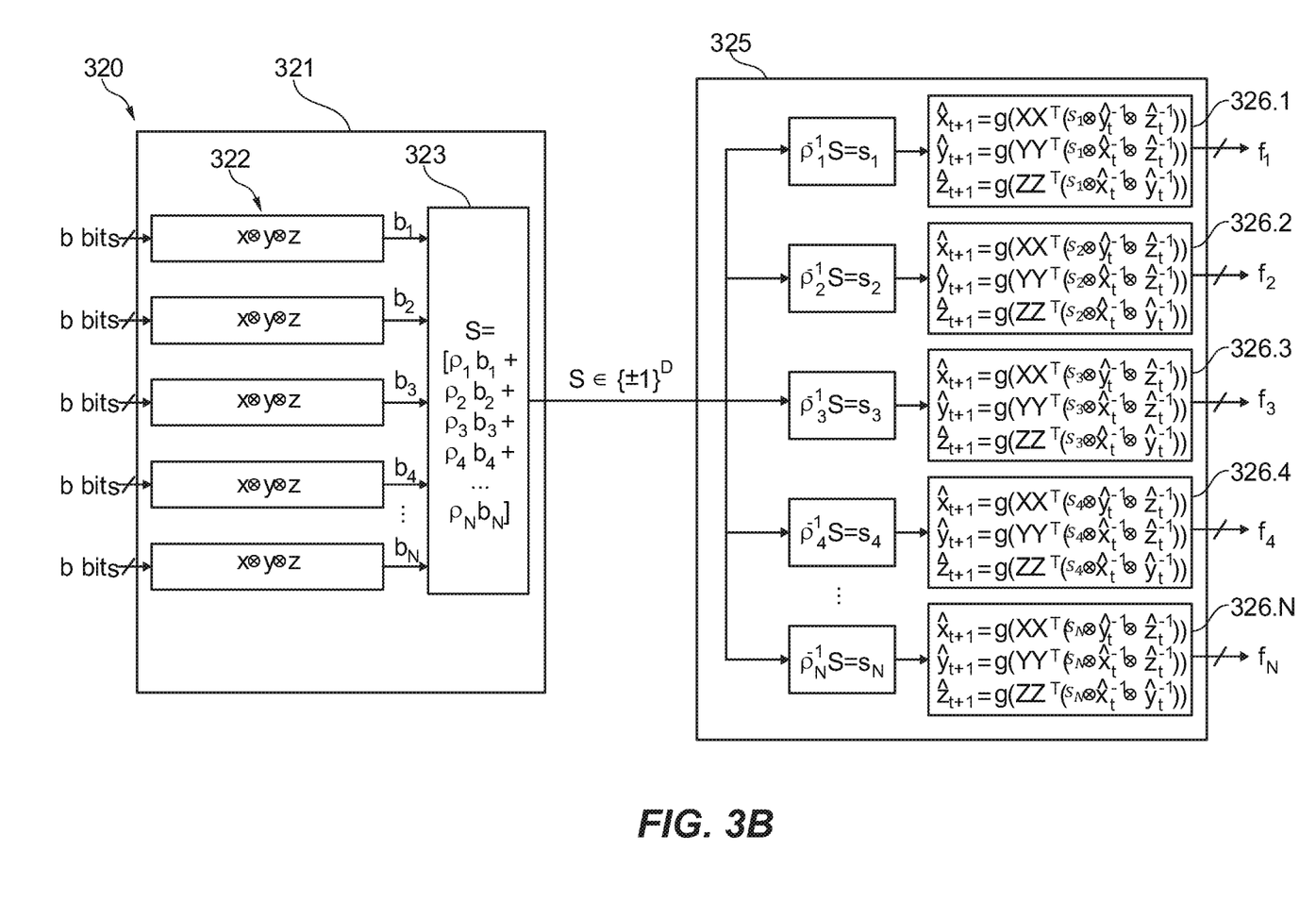
FIG. 3B is a diagram illustrating a resonator network system in accordance with an example of the present subject matter.

Referring now to FIGS. 3A-B, a flowchart of a method for factorizing hypervectors in parallel 300 is depicted in accordance with an example of the present subject matter. For the purpose of explanation, the method described in FIG. 3A may be implemented in a resonator network system 320 as shown in FIG. 3B comprising multiple resonator networks such as the resonator network of FIG. 1, but is not limited to this implementation. The resonator network system 320 of FIG. 3B comprises an encoder 321 and a decoder 325. The encoder 321 may comprise an encoding module 322 and a combiner 323.

A set of N resonator networks such as the resonator network of FIG. 2, where N>1 may be provided in step 301. This is illustrated in FIG. 3B, where the set of resonator networks 326.1-326.N are provided in the decoder 325. The encoding module 322 may represent in step 303 a set of N data structures by N hypervectors $b_1, b_2 \ldots b_N$ respectively. N permutations $\rho_1, \beta_2 \ldots \beta_N$ may be applied in step 305 by the combiner 323 to the N hypervectors $b_1, b_2 \ldots b_N$ respectively as follows $\rho_1 b_1, \rho_2 b_2 \ldots \rho_N b_N$. The N permuted hypervectors $\rho_1 b_1, \rho_2 b_2 \ldots \rho_N b_N$ may be combined by the combiner 323 in step 307 into a bundled hypervector S such that $S\in\{\pm 1\}^D$ as follows: $S=[\rho_1 b_1+\rho_2 b_2 \ldots +\rho_N b_N]$, where hypervector S may be referred to as bundled hypervector. The brackets refers to a sign clipping that normalizes the values of the bundled hypervector to ±1.

For each resonator network r of the set of resonator networks 326.1-N the respective input hypervector $s_r$ may be generated in step 309 by applying the inverse of the permutation $\rho_r^{-1}$ associated with the resonator network r to the bundled hypervector S as follows: $\rho_r^{-1}S=s_r$, i.e., $\rho_1^{-1}S=s_1$, $\rho^{-1}S=s_2 \ldots \rho_N^{-1}S=s_N$. The set of resonator networks 326.1-N may process in step 311 the respective inputs $s_1$, $s_2 \ldots s_N$ to provide N factorized hypervectors $f_1, f_2 \ldots f_N$. For example, the processing of each input hypervector $s_r$ by the resonator network may find the code hypervectors $x^{\alpha_r}$, $y^{\beta_r}$ and $z^{\gamma_r}$ that form the input hypervector $s_r$, where $\alpha_r \in \{1, 2, \ldots, M_x\}$, $\beta_r \in \{1, 2, \ldots, M_y\}$ and $\gamma_r \in \{1, 2, \ldots, M_z\}$. The factorized hypervectors $f_r$ may be defined as $f_r = x^{\alpha_r} \odot y^{\beta_r} \odot z^{\gamma_r}$. The factorized hypervector $f_r$ may be referred to as an estimate (or factorized version) of the input hypervector $s_r$ and $b_r$.

Figure 4A:
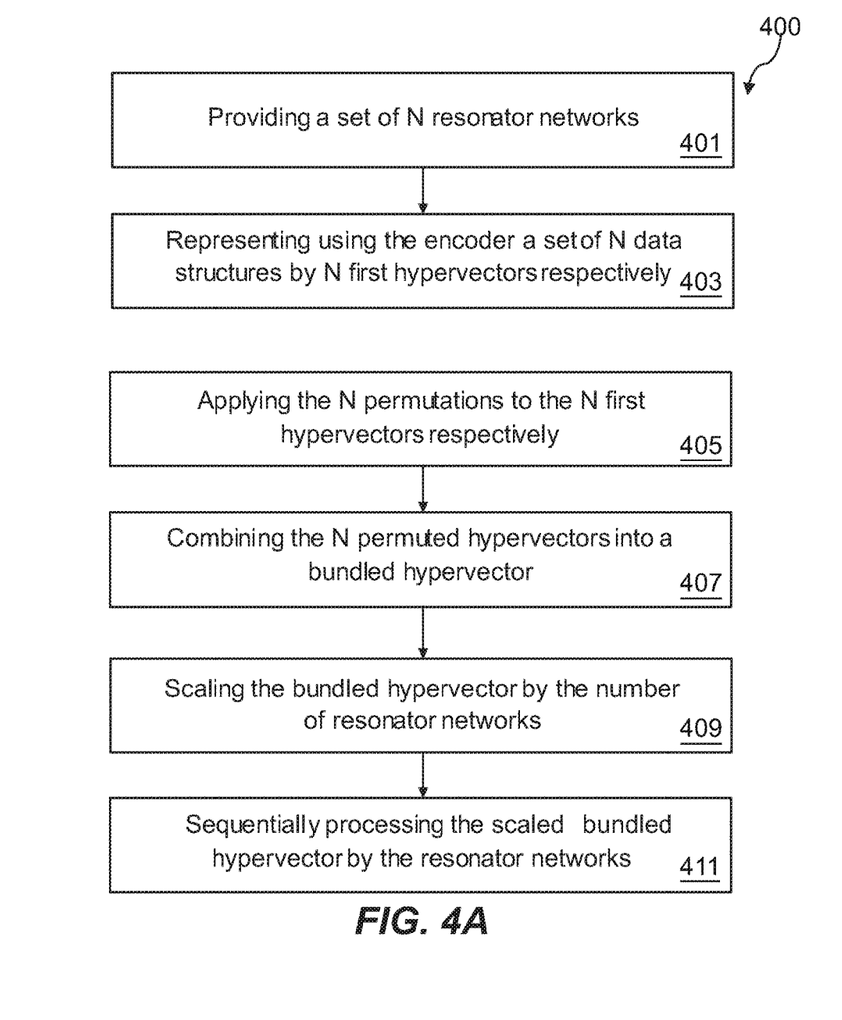
FIG. 4A is a flowchart of a method for factorizing a plurality of hypervectors in accordance with an example of the present subject matter.
Figure 4B:
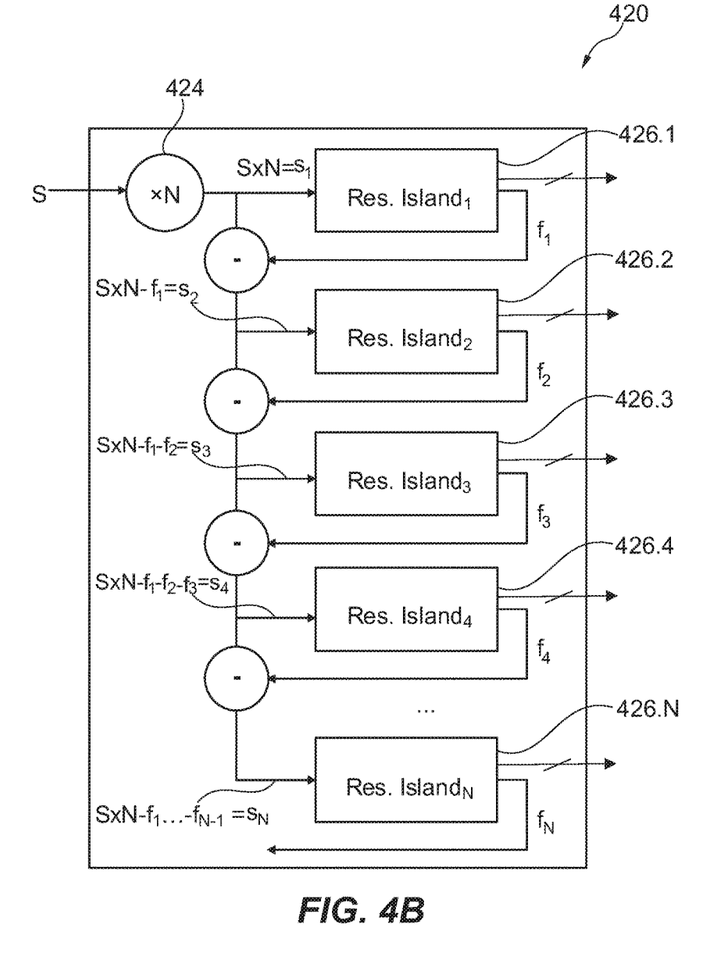
FIG. 4B is a diagram illustrating a resonator network system in accordance with an example of the present subject matter.

Referring now to FIGS. 4A-B, a flowchart of a method for factorizing hypervectors sequentially 400 is depicted in accordance with an example of the present subject matter. For the purpose of explanation, the method described in FIG. 4A may be implemented using a decoder 420 as shown in FIG. 4B comprising multiple resonator networks such as the resonator network of FIG. 1, but is not limited to this implementation.

A set of N resonator networks such as the resonator network of FIG. 2, where N>1 may be provided in step 401. This is illustrated in FIG. 4B, where the set of resonator networks 426.1-426.N are provided in the decoder 420. An encoding module such as the encoding module 322 of FIG. 3B may represent in step 403 a set of N data structures by N hypervectors $b_1, b_2 \ldots b_N$ respectively. N permutations $\rho_1, \rho_2 \ldots \rho_N$ may be applied in step 405 by a combiner such as the combiner 323 of FIG. 3B to the N hypervectors $b_1, b_2 \ldots b_N$ respectively as follows $\rho_1 b_1, \rho_2 b_2 \ldots \rho_N b_N$. The N permuted hypervectors $\rho_1 b_1, \rho_2 b_2 \ldots \rho_N b_N$ may be combined by the combiner in step 407 into a bundled hypervector S such that $S \in \{\pm 1\}^D$ as follows: $S=[\rho_1 b_1 + \rho_2 b_2 \ldots + \rho_N b_N]$, where hypervector S may be referred to as bundled hypervector. The brackets refer to a sign clipping that normalizes the values of the bundled hypervector to $\pm 1$.

The bundled hypervector may be scaled in step 409 by a scaler 424 of the decoder 420 by the number N of resonator networks. The scaled bundled hypervector may be processed sequentially in step 411 by the set of resonator networks 426.1-N. In a first processing step, the resonator network 426.1 may receive the input hypervector $s_1$ which is the scaled signal S×N and factorize the hypervector $s_1$ to obtain a factorized hypervector $f_1$. The factorized hypervector $f_1$ may be subtracted from the scaled hypervector S×N and the resulting hypervector $s_2 = S \times N - f_1$ may be factorized by the second resonator network 426.2 to obtain factorized hypervector $f_2$. The factorized hypervector $f_2$ may be subtracted from the hypervector $s_2$ and the resulting hypervector $s_3 = S \times N - f_1 - f_2$ may be factorized by the third resonator network 426.3 to obtain factorized hypervector h. The factorized hypervector $f_3$ may be subtracted from the hypervector $s_3$ and the resulting hypervector $s_4 = S \times N - f_1 - f_2 - f_3$ may be factorized by the fourth resonator network 426.4 to obtain factorized hypervector $f_4$ and so on. The last resonator network 426.N may factorize hypervector $s_N = S \times N - \sum_{j=1}^{N-1} f_j$ in order to obtain the factorized hypervector $f_N$.

Figure 5:
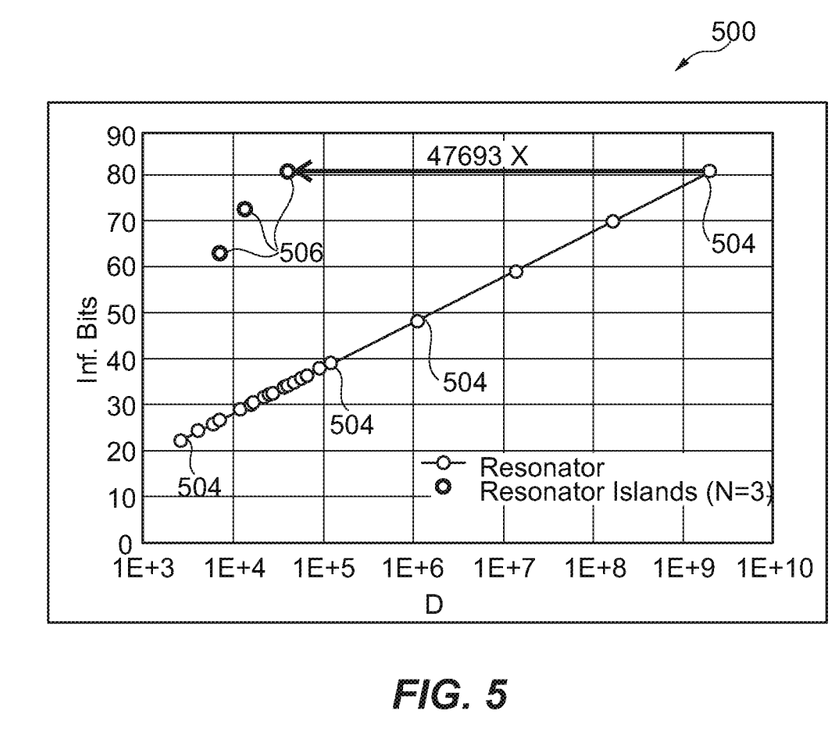
FIG. 5 is a plot of the search space size in term of number of information bits as function of the hypervector dimension.

Referring now to FIG. 5, a plot 500 showing the search space size in term of number of information bits as function of the hypervector dimension D is depicted according to an exemplary embodiment.

Plot 500 shows the results of factorizing hypervectors with different sizes D using a single resonator network (represented by dots 504 linked by a line) and using a set of three (N=3) resonator networks (represented by dots 506) according to the present subject matter. In this example, the number of concepts is three, F=3 and the size of each codebook is defined as follows: $M_x=7$, $M_y=8$ and $M_z=9$. Compared to a single multiplicative resonator, the set of three resonator networks according to the present subject matter may reduce the hypervector dimension D by four orders (as indicated in the plot 500) of magnitude for the same functionality (e.g., at the same decoded accuracy, information bits, and convergence speed). A larger set of resonator networks (N>3) may further improve the performance.

Figure 6:
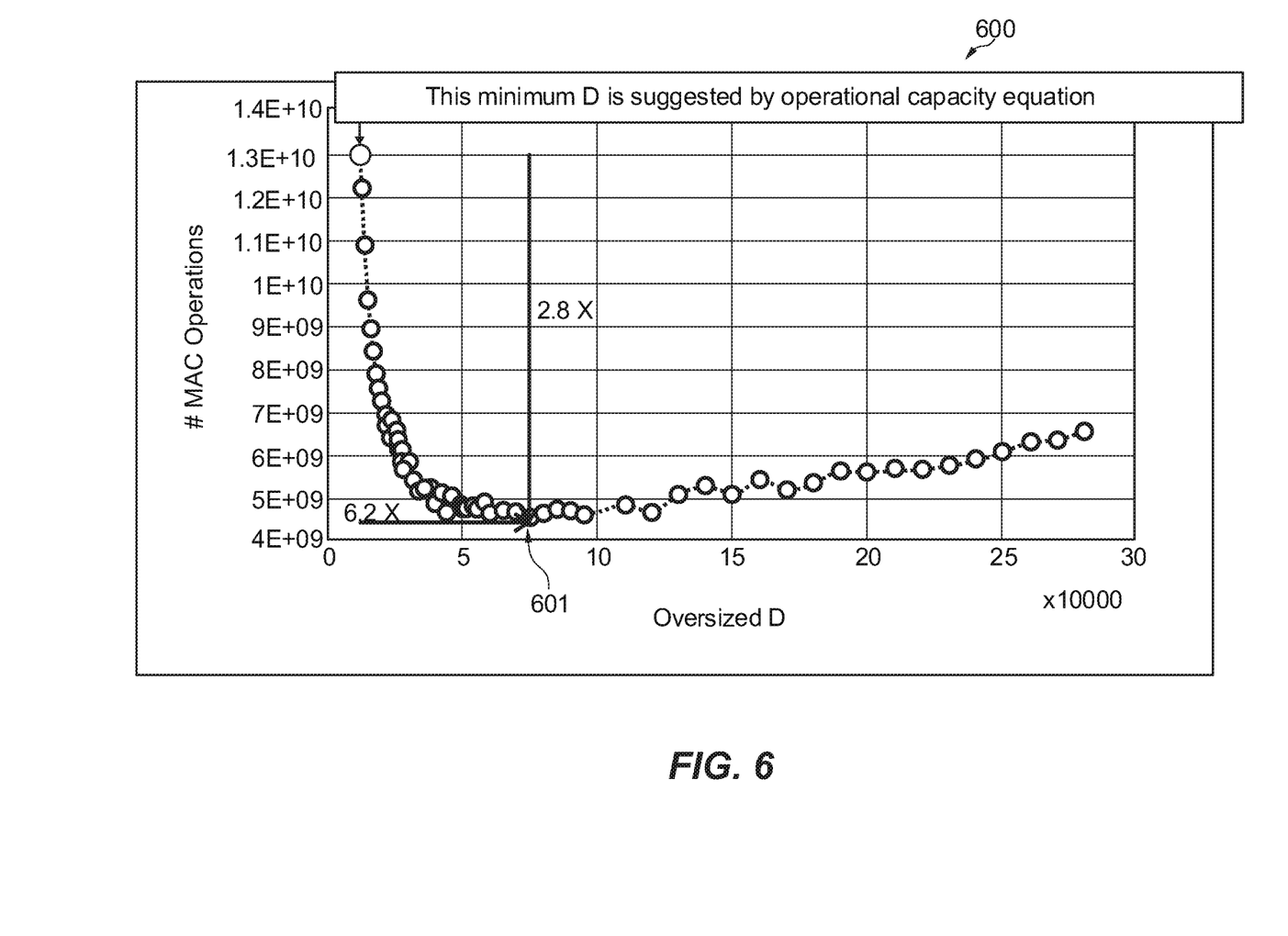
FIG. 6 is a plot is the number of multiply accumulate (MAC) operations in a set of resonator networks according to the present subject matter as function of the hypervector dimension.

Referring now to FIG. 6, a plot 600 showing the number of MAC operations in a set of five (N=5) resonator networks is depicted according to the present subject matter as a function of the hypervector dimension D. In this example, the number of concepts is three, F=3 and the size of each codebook is defined as follows: $M_x=7$, $M_y=7$ and $M_z=7$. This plot may enable an optimization method to determine an optimal size $D_{over}$ of the hypervector that is larger than the initial size D but still provides better performances. As indicated in the plot 600, the first point in the plot represents the initial dimension D that may need to be increased. As shown in the plot 600, the number of MAC operations decreases with increasing size D of the hypervector until reaching a target optimal value 601 of $D_{over}$. Oversizing the dimensions may significantly reduce the number of iterations to converge, hence the effective number of operations.

Figure 7:
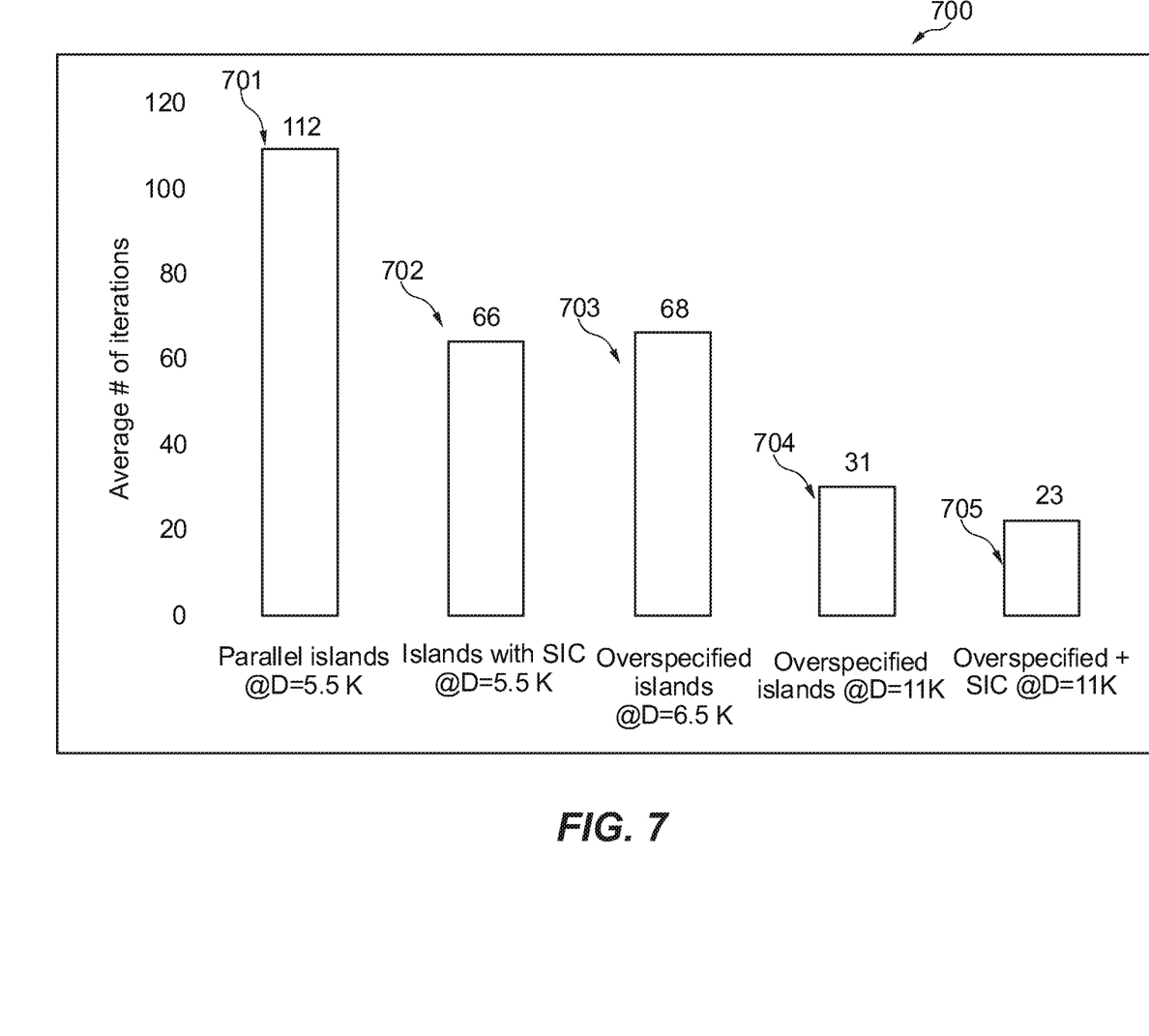
FIG. 7 is a plot showing the average number of iterations for different implementations of the present method using a set of resonator networks.

Referring now to FIG. 7, a plot 700 showing the average number of iterations for different implementations of the present method using a set of five (N=5) resonator networks is depicted, according to an exemplary embodiment. In this example, the number of concepts is three, F=3 and the size of each codebook is defined as follows: $M_x=6$, $M_y=6$ and $M_z=6$. The histogram 701 represents the number of iterations when the parallel processing as described in FIGS. 3A-B is performed using a hypervector of size D=5.5 k. The histogram 702 represents the number of iterations when the sequential processing (the sequential processing may be referred to as successive interference cancellation (SIC)) as described in FIGS. 4A-B is performed using a hypervector of size D=5.5 k. The histogram 703 represents the number of iterations when the parallel processing as described in FIGS. 3A-B is performed using a hypervector of size D=6.5 k. The histogram 704 represents the number of iterations when the parallel processing as described in FIGS. 3A-B is performed using hypervector of size D=11 k. The histogram 705 represents the number of iterations when the sequential processing as described in FIGS. 4A-B is performed using a hypervector of size D=11 k.

The present subject matter may comprise the following clauses.

Clause 1. A method comprising: providing an encoder for representing data structures in a vector space, the vector space being defined by a set of matrices, referred to herein as codebooks, which encode a set of cognitive concepts respectively, the codebooks comprising candidate code hypervectors representing items of the respective concept; providing a set of N resonator networks, where N>1, each resonator network being configured to receive an input hypervector representing a data structure and to perform an iterative process in order to factorize the input hypervector into individual hypervectors representing the set of concepts respectively, the set of N resonator networks being associated with N permutations respectively; representing using the encoder a set of N data structures by N first hypervectors respectively; applying the N permutations to the N first hypervectors respectively; combining the N permuted hypervectors into a bundled hypervector; processing the bundled hypervector by the resonator networks, thereby factorizing the N first hypervectors.

Clause 2. The method of clause 1, the processing of the bundled hypervector at the respective resonator network comprising: applying to the bundled hypervector an inverse permutation of the permutation associated with the resonator network resulting in a second hypervector; and processing the second hypervector.

Clause 3. The method of clause 2, the processing of the bundled hypervector being performed in parallel by the set of resonator networks.

Clause 4. The method of clause 1, the processing comprising: ranking the N resonator networks; scaling the bundled hypervector by the number N of resonator networks; sequentially processing the scaled bundled hypervector in accordance with the ranking; wherein the processing by a current resonator network comprises:producing a second hypervector by subtracting from the scaled bundled hypervector zero or more outputs of the zero or more preceding resonator networks; processing by the resonator network the second hypervector.

Clause 5. The method of clause 4, the ranking of the resonator network being performed such that an ordering of subtractions is applied to prevent noise amplification in the second hypervector.

Clause 6. The method of any of the preceding clauses 1 to 5, wherein a search space is defined by the number of candidate code hypervectors each having a size D, the method further comprising: increasing the size D of the candidate hypervectors while maintaining the same search space.

Clause 7. The method of any of the preceding clauses 1 to 6, comprising preventing access to a permutation of a given resonator network by the other resonator networks.

Clause 8. The method of any of the preceding clauses 1 to 7, the iterative process comprising for each concept of the set of concepts: computing an unbound version of a hypervector representing the concept, computing a similarity vector indicating a similarity of the unbound version with each candidate code hypervector of the concept, and generating an estimate of a hypervector representing the concept by a linear combination of the candidate code hypervectors, with weights given by the similarity vector, followed by an application of a non-linear function.

Clause 9. The method of clause 8, wherein the non-linear function is a sign function.

Clause 10. The method of any of the preceding clauses 1 to 9, the encoder being a feed forward neural network.

Clause 11. The method of any of the preceding clauses 1 to 10, the data structure being an image, the codebooks representing the concept of colours, the concept of shapes, the concept vertical positioning and the concept of horizontal positioning.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A method comprising:
providing an encoder for representing data structures in a vector space, the vector space being defined by a set of codebooks, which encode a set of cognitive concepts respectively, the codebooks comprising candidate code hypervectors representing items of the respective cognitive concepts;
providing a set of N resonator networks, where N>1, each resonator network being configured to receive an input hypervector representing a data structure and to perform an iterative process in order to factorize the input hypervector into individual hypervectors representing the set of cognitive concepts respectively utilizing superposition and clean-up memory, the set of N resonator networks being associated with N permutations respectively;
representing using the encoder a set of N data structures by N first hypervectors respectively;
applying the N permutations to the N first hypervectors respectively;
combining the N permuted hypervectors into a bundled hypervector; and
processing the bundled hypervector by the resonator networks, thereby simultaneously factorizing the N first hypervectors.

2. The method of claim 1, the processing of the bundled hypervector at the respective resonator network comprising:
applying to the bundled hypervector an inverse permutation of the permutation associated with the resonator network resulting in a second hypervector; and
processing the second hypervector.

3. The method of claim 2, the processing of the bundled hypervector being performed in parallel by the set of resonator networks.

4. The method of claim 1, the processing comprising:
ranking the N resonator networks;
scaling the bundled hypervector by the number N of resonator networks;
sequentially processing the scaled bundled hypervector in accordance with the ranking; wherein the processing by a current resonator network comprises:

producing a second hypervector by subtracting from the scaled bundled hypervector zero or more outputs of the zero or more preceding resonator networks;

processing by the resonator network the second hypervector.

5. The method of claim 4, the ranking of the resonator network being performed such that an ordering of subtractions is applied to prevent noise amplification in the second hypervector.

6. The method of claim 1, wherein a search space is defined by the number of candidate code hypervectors each having a size D, the method further comprising: increasing the size D of the candidate hypervectors while maintaining the same search space.

7. The method of claim 1, comprising preventing access to a permutation of a given resonator network by the other resonator networks.

8. The method of claim 1, the iterative process comprising for each concept of the set of concepts: computing an unbound version of a hypervector representing the concept, computing a similarity vector indicating a similarity of the unbound version with each candidate code hypervector of the concept, and generating an estimate of a hypervector representing the concept by a linear combination of the candidate code hypervectors, with weights given by the similarity vector, followed by an application of a non-linear function.

9. The method of claim 8, wherein the non-linear function is a sign function.

10. The method of claim 1, the encoder being a feed forward neural network.

11. The method of claim 1, the data structure being an image, the codebooks representing the concept of colours, the concept of shapes, the concept vertical positioning and the concept of horizontal positioning.

12. A resonator network system comprising:

a set of resonator networks, each resonator network being configured to receive an input hypervector representing a data structure and to perform an iterative process in order to factorize the input hypervector into individual hypervectors representing a set of cognitive concepts respectively utilizing superposition and clean-up memory, the set of N resonator networks being associated with N permutations respectively;

the resonator network system being configured for applying the N permutations to N first hypervectors respectively, the N first hypervectors representing a set of N data structures respectively; and combining the N permuted hypervectors into a bundled hypervector; and the resonator networks being configured for processing the bundled hypervector, thereby simultaneously factorizing the N first hypervectors.

13. The system of claim 12, further comprising an encoder, the encoder being configured for representing data structures in a vector space, the vector space being defined by a set of matrices, referred to herein as codebooks, which encode the set of concepts respectively, the codebooks comprising candidate code hypervectors representing items of the respective concept; the encoder being configured for representing the encoder the set of N data structures by the N first hypervectors respectively.

14. The system of claim 12, each resonator network being configured for processing the bundled hypervector by:

applying to the bundled hypervector an inverse permutation of the permutation associated with the resonator network resulting in a second hypervector; and processing the second hypervector.

15. The system of claim 12, being configured for scaling the bundled hypervector by the number N of resonator networks; wherein each resonator network is configured for:

producing a second hypervector by subtracting from the scaled bundled hypervector zero or more outputs of the zero or more resonator networks preceding the resonator network; and processing by the resonator network the second hypervector.

16. The system of claim 12, the iterative process comprising for each concept of the set of concepts:

computing an unbound version of a hypervector representing the concept, computing a similarity vector indicating a similarity of the unbound version with each candidate code hypervector of the concept, and generating an estimate of a hypervector representing the concept by a linear combination of the candidate code hypervectors, with weights given by the similarity vector, followed by an application of a non-linear function.

* * * * *